United States Patent

Paice

[11] 4,165,527
[45] Aug. 21, 1979

[54] CURRENT LIMITING CIRCUIT ARRANGEMENT

[75] Inventor: Derek A. Paice, Murrysville, Pa.

[73] Assignee: Electric Power Research Institute, Inc., Palo Alto, Calif.

[21] Appl. No.: 868,683

[22] Filed: Jan. 11, 1978

[51] Int. Cl.² .............................................. H02H 9/04
[52] U.S. Cl. ........................................ 361/113; 323/9; 323/75 M; 323/79
[58] Field of Search ...................... 323/9, 76, 7, 79, 80, 323/75 M, 81; 361/43, 58, 113; 307/237, 326

[56] References Cited

U.S. PATENT DOCUMENTS

| | | | |
|---|---|---|---|
| 2,495,791 | 1/1950 | Van Daele et al. | 361/113 |
| 3,418,532 | 12/1968 | Becker | 361/113 |
| 3,745,416 | 7/1973 | Thanawala | 361/58 |

FOREIGN PATENT DOCUMENTS 511651  12/1975  U.S.S.R. ..................................... 361/58

Primary Examiner—Gerald Goldberg
Attorney, Agent, or Firm—Flehr, Hohbach, Test, Albritton & Herbert

[57] ABSTRACT

A current limiting circuit arrangement is disclosed herein and includes a pair of parallel connected circuits, preferably identical circuits, each of which includes series connected conductive and capacitive reactance tuned to resonate at a given frequency. The arrangement also includes means, preferably a single voltage transformer, for maintaining the voltage across the capacitive reactance in one circuit and the voltage across the capacitive reactance in the other circuit equal and means for detuning these circuits, that is, taking them out of resonance in response to a predetermined condition.

11 Claims, 3 Drawing Figures

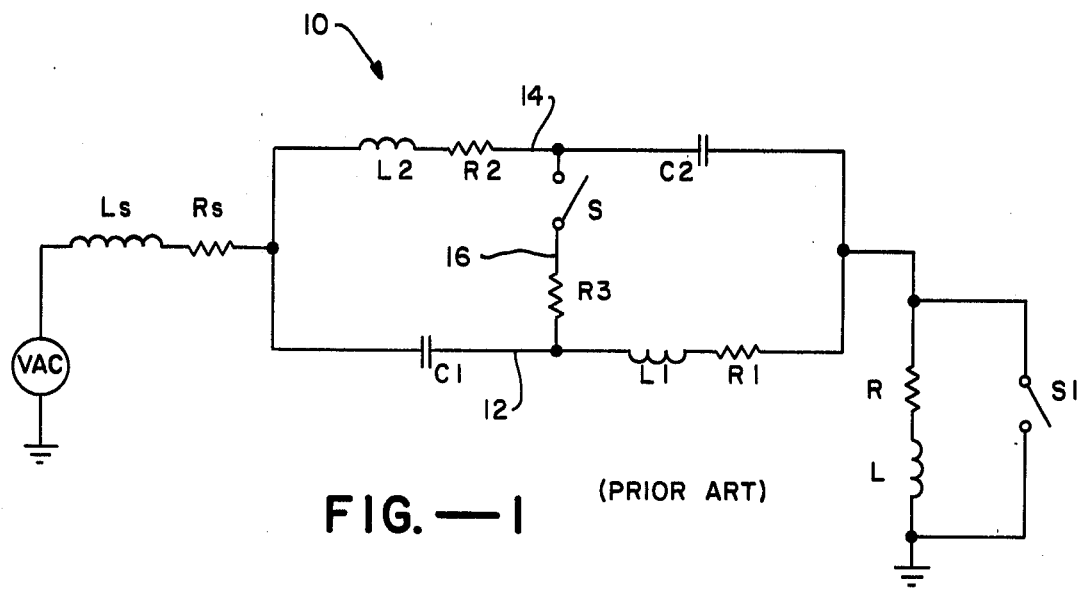
FIG.—1 (PRIOR ART)
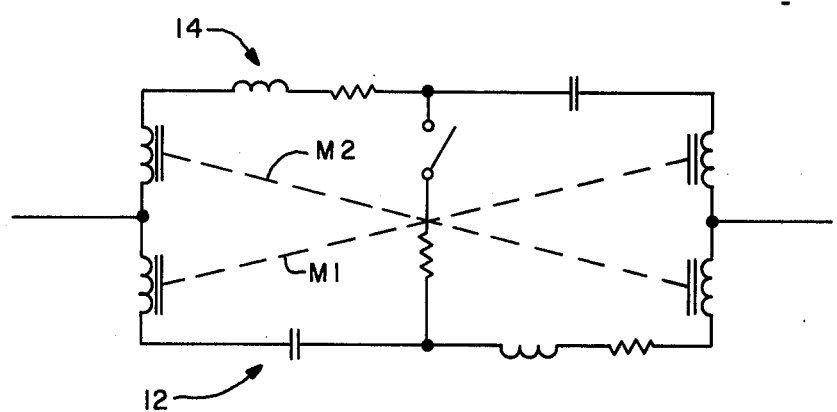
FIG.—2 (PRIOR ART)
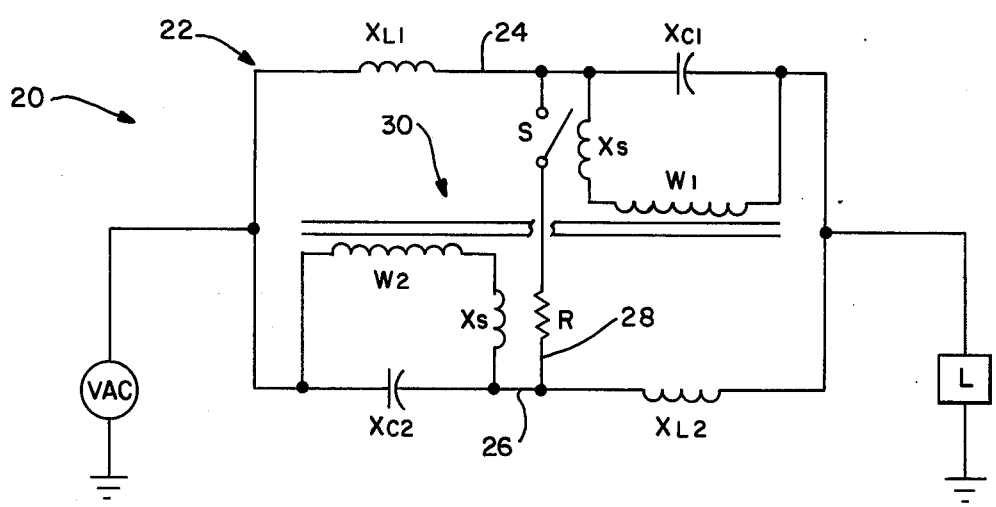
FIG.—3

CURRENT LIMITING CIRCUIT ARRANGEMENT

BACKGROUND OF THE INVENTION

The present invention relates generally to current limiting circuits and more particularly to current balancing in circuits of this type.

It is quite common to employ current limiting circuits in high power electrical systems. One such circuit is illustrated in FIG. 1 which has been designated as "prior art". As illustrated in this figure, the circuit, which is generally designated by the reference numeral 10, is connected between an AC power supply (VAC) including source impedance Ls and Rs and a load L and R. This circuit includes a pair of substantially identical parallel connected circuits 12 and 14, each of which includes series connected capacitive and inductive reactance L1, C1 and L2, C2 and resistors R1 and R2, respectively, tuned to resonate at a given frequency. This circuit arrangement also includes a third circuit 16 which is connected across the parallel circuits and which includes a resistance R3 and a switch S.

Under normal operation, the circuit 16 just described should have no significant effect on either the supply or the load. In this situation, the voltage supply VAC supplies power through its source impedance Ls and Rs, through the two circuits 12 and 14 (note that S is open) and finally to the load L1 and R1. If these circuits are indeed equal and if they are tuned to resonate at the supply frequency, there is only a small voltage drop across the limiter 10 caused by the small resistances R1 and R2 which are actually the inherent resistances of the inductors. Moreover, the current through circuit 12 is equal to the current through circuit 14, again assuming that the two circuits are identical. Assume now that a short circuit occurs at the load, simulated for example by closing the switch S1 which is connected across the load. Obviously, in and by itself, this condition would cause a rise in the current through the parallel circuits 12 and 14. To prevent this from happening, the switch S closes in response to the short circuit and the damping resistor R3 is interconnected between the two resonant circuits, thereby taking these circuits out of resonance and causing their impedance to rise to a relatively high value which, in turn, serves to limit the short circuit current.

The particular way in which the circuits 12 and 14 are taken out of resonance, that is, detuned, is of course not limited to the particular circuit 16 illustrated in FIG. 1. This can be accomplished in a number of conventional ways, including some illustrated in U.S. Pat. No. 3,418,532 which discloses a number of current limiters and different types of switching members including, for example, an inductive choke, a surge voltage arrester, spark gaps, or voltage-dependant resistors.

From a practical design standpoint, it is extremely important that the currents through the two paths 12 and 14 in the circuit arrangement described above remain equal or nearly equal under all conditions, and that their arithmetic sum is approximately equal to the line current during normal circuit operation. More specifically, by designing the circuit arrangement to accomplish this, the components of each circuit 12 and 14 can be identical and the necessary "ratings" of these components can be at a minimum. In this regard, it is important to note that a circuit, even though in balance initially, can become unbalanced through for example a malfunctioning component, unless the circuit design anticipates this. If in the design of the arrangement it is anticipated that the currents will not remain substantially equal, due for example to malfunction of individual components, then it is necessary in the initial design to compensate for this, which means providing components in both circuits with substantially higher ratings. This is because it may not be known which of the circuits will carry the higher current. For example, in a typical 300 MVA, 1200 ampere system using a nominal reactance value of 14 ohms and a coil resistance of 0.14 ohms, if one branch has 5% surplus capacitive reactance and the other has 5% surplus inductive reactance, a parallel resonance occurs and substantial voltage is dropped across the current limiter. Hence, the currents through the individual circuits 12 and 14 in this case would be 3060 amperes instead of the nominal 600 amperes. In view of the foregoing, the importance of current balancing in the circuit arrangement of the type described should be apparent. One typical way in which this is done is to employ switching equipment to trim the reactive values to keep the circuits balanced. While this design technique is feasible, because current balance is very sensitive to parameter variations, the switching equipment must be extremely precise. This is difficult to do even where the current balance is made less sensitive to component variations by designing the parallel branches to be slightly off resonance under normal operation.

Another balancing scheme is illustrated in FIG. 2 and utilizes two current balancing transformers M1 and M2 in conjunction with a circuit arrangement otherwise identical to previously described arrangement 10. As illustrated in FIG. 2, this prior art scheme places one winding of transformer M1 and one winding of transformer M2 in series with the components making up circuit 12 and the other windings of these transformers are placed in series with the components making up circuit 14. In this way, the transformers can continuously balance the current through the two circuits. These transformers separately balance the inductor and capacitor currents to accommodate the different phase relationships that exist in the current limiting mode. One transformer, balancing either inductor or capacitor current would also balance total current through the circuits. A disadvantage to this scheme is that the transformers must carry the total rated current and hence must themselves be rated accordingly.

As will be seen hereinafter, the present invention provides reliable current balancing in a current limiting circuit arrangement in an uncomplicated and economical manner. This is accomplished without the disadvantages inherent in the utilization of in-line transformers and yet more accurate than has been accomplished by utilizing external techniques such as the switching equipment described previously.

OBJECTS AND SUMMARY OF THE INVENTION

An object of the present invention is to provide a current limiting circuit arrangement of the general type described above, but one which is reliably current balanced in an uncomplicated and economical manner.

Another object of the present invention is to provide a circuit arrangement of the general type described, but one which does not utilize external switching equipment or other such external controls to balance the circuit.

Still another object of the present invention is to provide a circuit arrangement of the general type described, but one which does not require in line transformers to balance the current.

In carrying out these objects, it is important to understand why a current limiting circuit arrangement of the general type described above, even though initially designed to be current balanced and in resonance, does not remain in balance or in resonance. One major reason can be attributed to the capacitive reactance in the circuit. Specifically, it has been found that inductive reactance and its associated resistance is quite stable throughout the life of an inductor and that inductors, especially large inductors typically used in high voltage systems are relatively malfunction-free. On the other hand, capacitive reactance can be relatively unstable with time since capacitors are prone to defects with time. This is particularly true where the capacitive reactance is obtained by using a bank of hundreds of parallel capacitors in high voltage systems.

Accordingly, applicant has found that by maintaining the voltage across the capacitive reactance in one of the circuits comprising the current limiting circuit arrangement and the voltage across the capacitive reactance in the other circuit equal to each other, the current can be reliably balanced without otherwise affecting the circuits. As a result, the current limiting circuit arrangement of the present invention includes a first circuit including inductive and capacitive reactance connected in series and a second circuit which is connected in parallel to the first circuit and which also includes inductive and capacitive reactance connected in series. In addition, in accordance with the present invention, this arrangement includes means for maintaining the voltage across the capacitive reactance in the first circuit and the voltage across the capacitive reactance in the second circuit equal to each other.

BRIEF DESCRIPTION OF THE DRAWING

FIG. 1 is a schematic diagram of an electrical system including a prior art current limiting circuit arrangement.

FIG. 2 is a schematic diagram of another prior art current limiting circuit arrangement and particularly one which is current balanced.

FIG. 3 is a schematic diagram of an electrical system which includes a current balanced, current limiting circuit arrangement constructed in accordance with the present invention.

DETAILED DESCRIPTION AND PREFERRED EMBODIMENTS

As just stated, FIG. 1 is a schematic diagram of an electrical system including a prior art current limiting circuit arrangement and FIG. 2 is a schematic diagram of a second prior art current limiting circuit arrangement, particularly one which is current balanced. Both of these prior art arrangements have been discussed previously and hence a further detailed discussion will not be provided. Accordingly, attention is immediately directed to FIG. 3 which illustrates an electrical system 20 which includes a current limiting circuit arrangement 22 constructed in accordance with the present invention.

Electrical system 20 is in many respects similar if not identical to previously described system 10 and, in fact, current limiting circuit arrangement 22 is similar in many respects to previously described arrangement 10. For example, like the system described in FIG. 1, system 20 includes an AC power supply indicated at VAC with its associated impedance (not shown) and, of course, a load indicated at L. Circuit arrangement 22, like arrangement 10, includes two parallel connected circuits 24 and 26, each of which includes series connected capacitive and inductive reactance. Specifically, as illustrated in FIG. 3, circuit 24 includes inductive reactance $X_{L1}$ and capacitive reactance $X_{C1}$ and circuit 26 includes inductive $X_{L2}$ and capacitive reactance $X_{C2}$. Moreover, circuit arrangement 22, like arrangement 10, includes a third circuit, specifically circuit 28, which is connected across the two circuits 24 and 26 and which includes a resistor R, specifically a damping resistor in series with a switch S.

With the exception of the manner in which circuit arrangement 22 is current balanced, this arrangement is similar in operation to previously described arrangement 10. Specifically, in a preferred embodiment, the circuits 24 and 26 are substantially identical, at least they are designed to be identical, and are tuned to resonate at the supply frequency. Accordingly, during normal operation the switch S is open, thereby opening circuit 28 and current passes through both circuits 24 and 26 from the voltage line to the load. With these circuits in resonance, the current through each is at maximum and the impedance is at minimum. Should there be a short or for some other reason, should the current through the system start to elevate, the switch S can be readily made to close for detuning circuits 24 and 26 and causing the impedance in the circuits to increase and the current to decrease. The particular switching arrangement represented by the switch S can take any suitable form and can be readily provided by those skilled in the art.

In accordance with the present invention, circuit 22 includes means generally designated at 30 for maintaining the voltage across capacitive reactance $X_{C1}$ in circuit 24 and the voltage across capacitive reactants $X_{C2}$ in circuit 26 balanced, that is, equal to one another. In this way, should the capacitive impedance in one of these circuits, for example $X_{C1}$, stray from its rated value due, for example, to a malfunction, and thereby change the voltage across it, causing a voltage imbalance between the two circuits, means 30 will automatically rebalance these voltages. Since, as stated previously, the inductive reactance is generally quite stable, and most likely will not significantly contribute to an imbalance, means 30 for all practical purposes maintains the two circuits in current balance.

In a preferred embodiment of the present invention, as illustrated in FIG. 3, means 30 is comprised of a conventional voltage transformer T having a pair of windings $W_1$ and $W_2$ with a 1:1 turns ratio. The winding W1 is connected across the capacitive reactance $X_{C1}$ and the winding W2 is connected across the capacitive reactance $X_{C2}$. For purposes of illustration, the reactance of each of these windings $W_1$ and $W_2$ are shown as Xs.

The manner in which transformer T balances these voltages across $X_{C1}$ and $X_{C2}$ should be apparent. Let it be assumed first that both of these circuits 24 and 26 are in resonance and that the current through one is equal to the current through the other. In this case, the voltage across $X_{C1}$ would be equal to the voltage across $X_{C2}$ and no transfer of energy would take place across the transformer T. However, now let it be assumed that there is a change in the capacitive reactance.

For example, let it be assumed that $X_{C1}$ is comprised of a bank of parallel capacitors in a high power electrical system. Further, let it be assumed that one or more of these capacitors malfunctions and is lost to the bank. In this case, the capacitance will decrease; however, if the transformer leakage is neglected, the voltage across $X_{C1}$ and $X_{C2}$ remains the same by reason of the transformer with equal windings $W_2$ and $W_1$. Because the two paths 24 and 26 are in parallel, the total voltage drop along them must be equal and if the capacitor voltages are equal, the inductor voltages must also be equal. Now the capacitance bank $X_{C1}$, which has increased its impedance, must draw less current than the other bank $X_{C2}$. To develop equal inductor voltages, an additional current must be passed through inductor $X_{L1}$. This current is drawn into winding $W_1$ and passes out of winding $W_2$. It serves to raise the current in inductor $X_{L1}$ and reduce it in inductor $X_{L2}$, such that equal inductor voltages are caused to exist.

From the foregoing, it is clear that once there is an initial imbalance of one capacitor bank, the rebalancing of the circuits ensures equal inductor currents and equal capacitor voltages. For other variations of the values in $X_{C1}$, $X_{L1}$, $X_{C2}$ and $X_{L2}$, good current balancing is also obtained. It should also be apparent that this is accomplished without using external switching arrangements and without using in-line transformers.

It is further apparent that an analogous arrangement in which a single 1:1 transformer is connected across each inductor would perform in a practically identical manner with good balancing of the currents being obtained. More specifically, by applying the transformer T and associated windings $W_1$ and $W_2$ and ($X_S$) across inductors $X_{L1}$ and $X_{L2}$ respectively instead of $X_{C1}$ and $X_{C2}$ as shown, the voltages across capacitors would be maintained equal as would the voltages across the inductors.

Another variation of the proposed current balancing technique can be anticipated in which the 1:1 balancing transformer is connected across only a fraction of the inductors in each branch or alternatively across a fraction of the capacitors in each branch. These variants may be useful as a means of modifying the rating requirements of the balancing transformer to more nearly match standard available transformer ratings.

Having described system 20 and circuit 22, attention is now directed to an algebraic analysis of the circuit. Assume that transformer T has leakage reactance, but negligible winding resistance and magnetizing current. Also, neglect inductor losses and the following equation results:

$$I_1/I_2 = ((X_{C2}-X_{L2})+X_{L2}(X_{C1}+X_{C2})/2X_S)/((X_{C1}-X_{L1})+X_{L1}(X_{C1}+X_{C2})/2X_S)$$

Where $I_1$ is the current through circuit 24, $I_2$ is the current through circuit 26 and $X_S$ is the leakage reactance. Moreover, let the following equation represent the percent unbalance in the two circuits:

$$\% \text{ current unbalance} = |(|I_1|/|I_2|)-1| \times 100$$

Wherein I is the algebraic sum of the currents in the two circuits 24 and 26. Referring now to the first equation, let the nominal reactance value of the limiter components be XNOM and the transformer leakage reactance per winding be XNOM/2. Then if the reactive unbalance in each branch is $+5\%$ XNOM and $-5\%$ XNOM, respectively, we can obtain:

$$I_1/I_2 = (0.05X_{NOM}+X_{NOM}(2X_{NOM})/X_{NOM})/(-0.05X_{NOM}+X_{NOM}(2X_{NOM})/X_{NOM})$$

From the foregoing, the percentage of current unbalance can be readily calculated and is only 2.5%. Under current limiting conditions, i.e., with the switch S closed and the damping resistor inserted, the algebraic results are more complicated and more difficult to interpret, especially if more detailed components representation is used. For this reason, a computer analysis was made for the limiting conditions. Good current balance was calculated and confirmed by tests on a 10KVA current model.

What is claimed is:
1. A current limiting circuit arrangement comprising:
 (a) a first circuit including inductive reactance and capacitive reactance connected together in series;
 (b) a second circuit including inductive reactance and capacitive reactance connected together in series, said second circuit being connected in parallel with said first circuit during normal operation of the circuit arrangement; and
 (c) means for maintaining the voltage across the capacitive reactance in said first circuit and the voltage across the capacitive reactance in said second circuit equal to one another during said normal operation when said circuits are in parallel.
2. An arrangement according to claim 1 wherein said voltage maintaining means includes a voltage transformer having a pair of windings with a 1:1 turns ratio, one of said windings being connected in parallel with one of said capacitive reactances and the other winding being connected in parallel with the other capacitive reactance.
3. An arrangement according to claim 1 wherein the inductive and capacitive reactances in said first circuit are substantially equal to the inductive and capacitive reactances in said second circuit, respectively, both of said circuits being tuned to resonate at a given frequency.
4. An arrangement according to claim 1 including a third circuit connected across said first and second circuit, said third circuit including resistance and switch means for opening and closing said third circuit depending upon predetermined conditions.
5. A current limiting circuit arrangement comprising:
 (a) a first circuit including inductive reactance and capacitive reactance which are connected together in series and tuned to resonate at a given frequency;
 (b) a second circuit substantially identical to said first circuit and connected in parallel therewith during normal operation of the circuit arrangement;
 (c) a third circuit connected across said first and second circuits and including a resistor and means for opening said third circuit during said normal operation and closing said third circuit in response to predetermined abnormal operation conditions of the circuit arrangement; and
 (d) means for maintaining the voltage across the capacitive reactance in said first circuit and the voltage across the capacitive reactance in said second circuit equal to one another during said normal operation when said first and second circuits are in parallel whereby to maintain the current through said first and second circuits equal even though the capacitive reactances in the first and second circuits vary from one another, so long as these latter circuits remain parallel and their inductive reactances remain equal, said means including a voltage transformer having a pair of windings with a 1:1 turns ratio, one of said windings being connected across one of said capacitive reactances and the other winding being connected across the other capacitive reactance.

6. In an electrical system including an AC power supply for supplying power at a given AC frequency, a load and a current limiting circuit arrangement connecting said power supply to said load, said circuit arrangement including a pair of substantially identical parallel connected circuits each of which includes series connected capacitive and inductive reactances tuned to resonate at said given frequency and means for detuning said circuits in the event the current to said load exceeds a predetermined value, whereby to limit the current from said supply to said load, the improvement comprising:

means maintaining the voltage across the capacitive reactance of one of said circuits and the voltage across the capacitive reactance of the other circuit equal to each other, for maintaining the current through said circuits approximately equal so long as said circuits remain in parallel and said inductive reactances are approximately equal.

7. The improvement according to claim 6 wherein said voltage maintaining means includes a voltage transformer having a pair of windings with a 1:1 turns ratio, one of said windings being connected in parallel with at least a part of one of the capacitive reactances and the other winding being connected in parallel with at least a part of the other capacitive reactance.

8. A current limiting circuit arrangement comprising:
(a) a first circuit including inductive reactance and capacitive reactance connected together in series;
(b) a second circuit including inductive reactance and capacitive reactance connected together in series, said second circuit being connected in parallel with said first circuit during normal operation of the circuit arrangement; and
(c) means for maintaining the voltage across the capacitive reactance in said first circuit and the voltage across the capacitive reactance in said second circuit equal to one another during said normal operation when said circuits are in parallel, said means including a voltage transformer having a pair of windings with a 1:1 turns ratio, one of said windings being connected in parallel with at least a fraction of one of said inductive reactances and the other winding being connected in parallel with an equal amount of the other inductive reactance.

9. An arrangement according to claim 8 wherein said one winding is connected in parallel with all of said one inductive reactance and wherein said other winding is connected in parallel with all of said other inductive reactances.

10. An arrangement according to claim 9 wherein the inductive and capacitive reactances in said first circuit are substantially equal to the inductive and capacitive reactances in said second circuit, respectively, both of said circuits being tuned to resonate at a given frequency.

11. An arrangement according to claim 9 including a third circuit connected across said first and second circuit, said third circuit including resistance and switch means for opening and closing said third circuit depending upon predetermined conditions.

* * * * *